United States Patent [19]

Carn

[11] Patent Number: 4,519,415

[45] Date of Patent: May 28, 1985

[54] LIQUID STORAGE TANK WITH EMERGENCY PRODUCT REMOVAL APPARATUS

[75] Inventor: William R. Carn, Naperville, Ill.

[73] Assignee: Chicago Bridge & Iron Company, Oak Brook, Ill.

[21] Appl. No.: 375,882

[22] Filed: May 7, 1982

[51] Int. Cl.³ .............................................. B65D 17/16
[52] U.S. Cl. .................................. 137/318; 137/572; 52/245; 220/1 B
[58] Field of Search ............... 137/318, 572, 312, 240; 220/1 B, 429; 52/245, 192, 405

[56] References Cited

U.S. PATENT DOCUMENTS

| 1,970,940 | 8/1934 | Laube | 52/192 X |
| 2,840,166 | 6/1958 | Eckel et al. | 137/318 X |
| 3,338,010 | 8/1967 | Waugh | 220/1 B X |
| 3,599,660 | 8/1971 | Stickney | 137/572 X |
| 4,215,721 | 8/1980 | Hetherington et al. | 137/240 X |
| 4,314,579 | 2/1982 | Wheatley et al. | 137/312 |

Primary Examiner—Martin P. Schwadron
Assistant Examiner—Stephen M. Hepperle
Attorney, Agent, or Firm—Marshall, O'Toole, Gerstein, Murray & Bicknell

[57] ABSTRACT

A storage tank for a volatile inflammable liquid is provided with an attachment fitting to which an elbow assembly can be attached to support a tapping machine. If the tank primary vessel fails, liquid retained by a secondary containment vessel can be drained out by using the tapping machine to make a hole through the attachment fitting and vessel walls. The attachment fitting is installed, when the tank is built, without impairing the integrity of the primary or secondary vessel walls or providing a hole therein.

2 Claims, 5 Drawing Figures

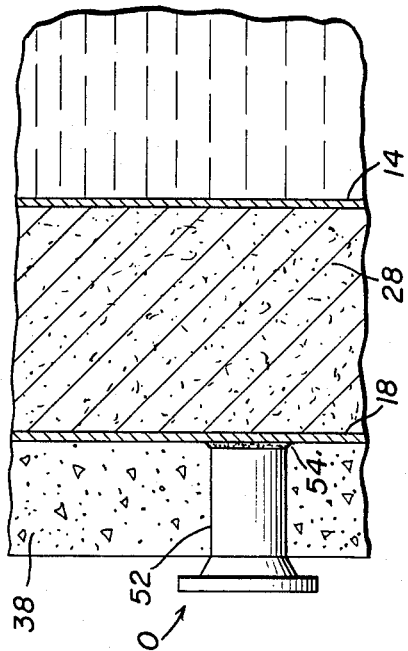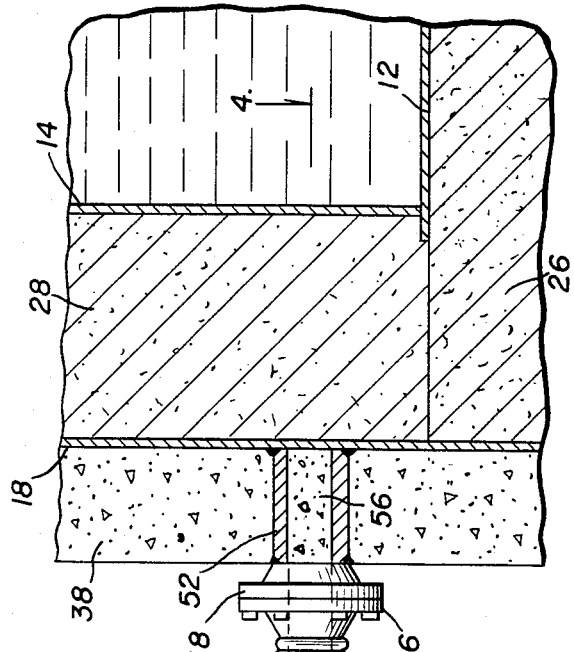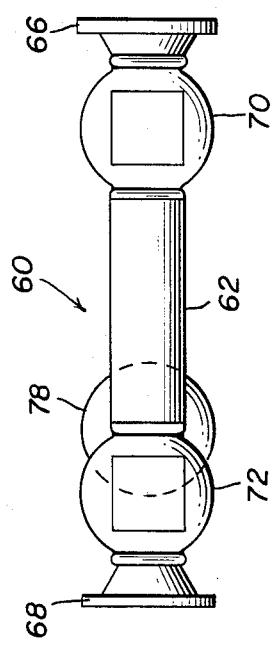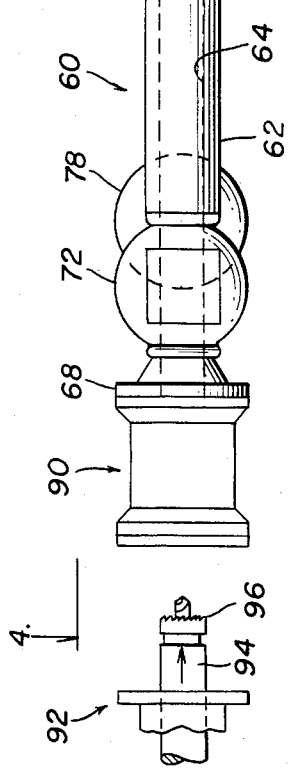

LIQUID STORAGE TANK WITH EMERGENCY PRODUCT REMOVAL APPARATUS

This invention relates to liquid storage tanks. More particularly, this invention is concerned with a liquid storage tank having a secondary containment vessel and apparatus for penetrating the vessel and removing liquid which is contained therein.

BACKGROUND OF THE INVENTION

Storage tanks for liquids are widely used commercially. Among the liquid products stored in tanks are gasoline, oil and ammonia, and liquefied gases such as natural gas (methane), propane, ethylene, oxygen and hydrogen. Because some of these and other liquid products are potentially hazardous, many of them are stored in double-shelled tanks or similar structures so that if the inner or primary containment vessel fails, the escaping liquid will be contained by the outer or secondary containment vessel. Often the space between the vessels contains insulation, as see Sattelberg et al U.S. Pat. No. 3,352,443. In some structures, the main secondary containment vessel may be spaced outwardly from a double-walled insulated tank. Laverman U.S. Pat. No. 3,791,164 discloses such a structure in which a vertical concrete wall constitutes a secondary containment vessel around a double-walled insulated tank for storing a cryogenic liquid. The annular space between the concrete wall and the tank is left open to the atmosphere in this embodiment although it can be enclosed by a roof.

Liquid storage tanks of the described types in past years were provided with one or more inlet and outlet pipes for filling and emptying the tanks. These pipes either penetrated one or more of the bottoms or one or more of the lower areas of the side walls. It is the feeling of some engineers and safety experts that it is undesirable to have any penetrations or holes in the bottoms or side walls of such tanks, including the primary and secondary containment vessels or structures because the penetrations compromise the integrity of the shell or wall where they are located. As a result, more and more new tanks have all pipes for filling and emptying the tank penetrate the roof so as to avoid having penetrations in the bottoms and/or lower portions of the tank side walls. Submerged pumps in each tank provide the pumping action to empty the tank.

While running the pipes through the roof solves one problem it creates another. Thus, in the event there is a failure of the primary containment vessel and the escaping liquid is contained by the secondary containment vessel, there are no openings and associated pipes in the tank bottoms or side wall lower portions through which the liquid can be removed from the primary or secondary containment vessels. It is expected that a failure as described would incapacitate the submerged pumps so that liquid could not be removed through the roof. A need accordingly exists for a tank provided with means by which escaped liquid can be removed from the tank primary and secondary containment vessels but which avoids penetrations through the tank bottoms and/or side wall lower portions until such time, if ever, the primary containment vessel fails and liquid escapes to the secondary containment vessel.

SUMMARY OF THE INVENTION

According to one aspect of the invention, there is provided a storage tank for a volatile inflammable liquid, liquefied gas or other liquid having properties which make it potentially dangerous comprising a primary liquid containment vessel capable of storing the liquid; a secondary liquid containment vessel having a wall spaced outwardly from and surrounding a substantial portion of the primary vessel, thereby defining an annular space between the two vessels capable of containing liquid which may escape from the primary vessel if it fails or is damaged; and an attachment fitting having a tubular portion permanently laterally joined to the secondary containment vessel wall and means structurally obstructing liquid communication between the annular space and the tubular portion.

The end of the tubular portion farthest from the wall is desirably provided with a flange which is readily accessible and adapted to have other equipment connected to it.

The secondary containment vessel wall can be metal and the fitting can be joined to the wall by welding so that continuity of the wall structurally obstructs liquid communication between the annular space and the tubular portion.

In another embodiment of the invention the secondary containment vessel wall can comprise an inner metal shell surrounded externally by a layer of reinforced concrete, the fitting tubular portion can be embedded in the concrete layer and joined to the inner metal shell by welding, with at least continuity of the inner metal shell structurally obstructing liquid communication between the annular space and the tubular portion. Desirably, the tubular portion of the fitting is filled with concrete.

In an alternative embodiment, the secondary vessel wall can be reinforced concrete without a cooperating metal shell or layer, the fitting tubular portion can be embedded in the concrete layer, and the tubular portion of the fitting can be filled with concrete.

The described embodiments having a concrete wall desirably have a flange external of the concrete on the end of the tubular portion farthest from the wall.

An additional aspect of the invention includes an elbow assembly, adapted to be connected to the attachment fitting, comprising an elongated member, having an axially straight bore, with one end adapted to be joined to the attachment fitting in fluid tight arrangement; a pair of spaced apart first and second valves in the elongated member which when open do not significantly obstruct the bore; and a branch tubular arm communicating with the elongated member bore, between the first and second valves, and containing a third valve. The three valves are preferably full opening valves, such as ball valves.

The elbow assembly elongated member desirably has an outer end with means adapted to connect a tapping machine thereto which has a tool which can extend through the elbow elongated member and penetrate at least the secondary containment wall through the tubular portion of the attachment fitting. Furthermore, it is usually advantageous for the tapping machine tool to be capable of making a hole through any insulation in the annular space and also through the inner containment vessel shell so that liquid can be drained from all such spaces.

Since the likelihood of the tank failing is very remote, it is usually unnecessary to connect the elbow assembly to the attachment fitting until such time as it may be needed. The elbow assembly can be stored in a safe place and be attached only when needed. However, it can be attached to the attachment fitting contemporaneously with construction of the tank or installation of the attachment fitting to the secondary containment vessel wall. In that case, it is essential that it be inspected periodically, kept in operable shape and be protected against adverse environmental action.

In the event the elbow assembly is joined to the attachment fitting when the tank is built or when the attachment fitting is installed, the tapping machine can be contemporaneously installed on the elbow assembly. Care must be taken, however, to protect the tapping machine so that in case of a tank failure the machine will be readily operable. Probably it is best though to refrain from attaching the tapping machine to the elbow assembly and to keep it available in a protected area so that it can be attached quickly at any time in the future if it is needed. A suitable tapping machine is available commercially from T. D. Williamson, Inc., Tulsa, Okla.

The elbow assembly usually includes a nozzle communicating with the branch arm between the third valve and the elongated member so that a gas or liquid can be fed to the elbow and the attachment fitting to flush them out or to increase or decrease the pressure therein. Similarly, a nozzle can be placed on the elbow assembly elongated member in communication with the bore past the first and second valves with the first valve being positioned to be closest to the attachment fitting. This nozzle can be used as a pressure relief valve or vent nozzle, to supply a fluid to the elbow to pressurize it, or to flush cuttings out of the hole made by the tapping tool.

In those instances where a low temperature liquid is in the tank, all exposed areas of the attachment fitting, the elbow assembly, and even parts of the tapping machine, can be insulated. Of course, where necessary for cryogenic operation all parts must be made of materials which can withstand such temperatures without failing.

The described invention is not limited to any particular type or size of storage tank. Thus, the invention can be used in double-shell tanks, including those having inner and outer bottoms, sidewalls and roofs; tanks which are insulated internally or externally or both; and tanks having concrete reinforcement.

BRIEF DESCRIPTION OF THE DRAWINGS

FIG. 2 is an exploded view, partially in section, of the attachment fitting shown in FIG. 1 and an elbow assembly adapted to be connected to the attachment fitting;

FIG. 3 is similar to FIG. 2 but it shows the elbow assembly bolted to the attachment fitting and with the working end of a tapping machine positioned for attachment to the elbow assembly;

DETAILED DESCRIPTION OF THE DRAWINGS

To the extent it is reasonable and practical the same numbers will be used in the various views of the drawings to identify the same or similar elements.

Figure 1:
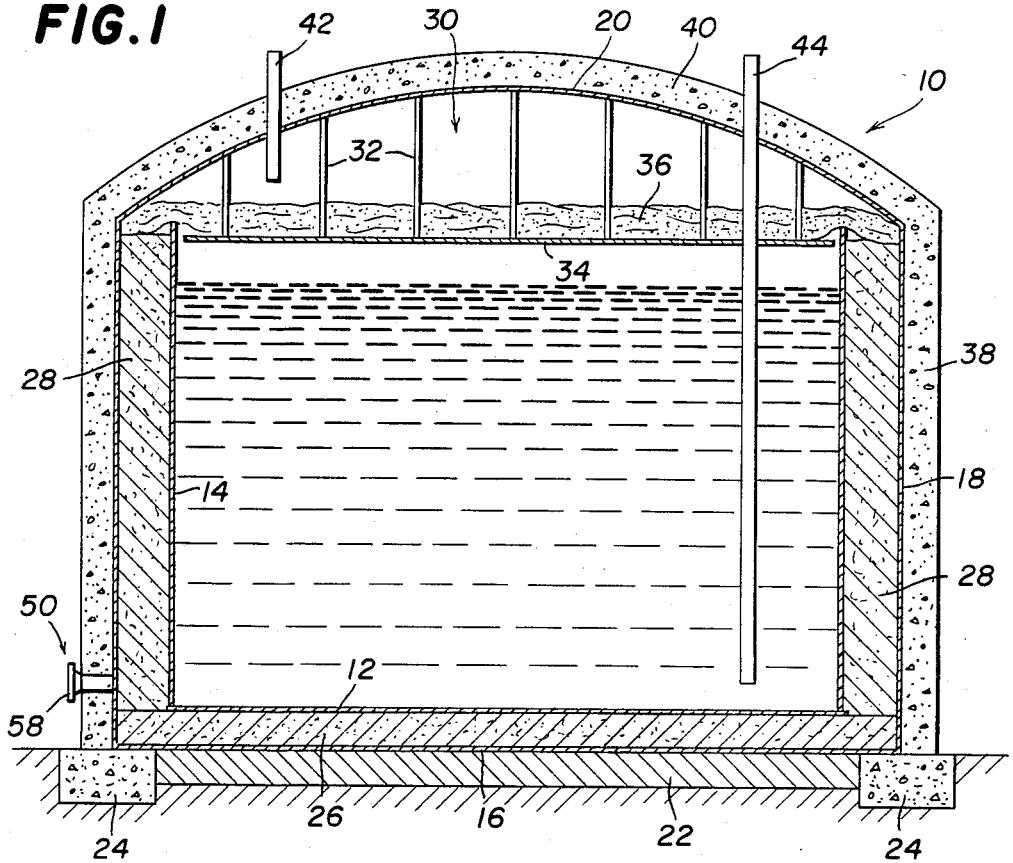
FIG. 1 is a vertical sectional view of a liquid storage tank provided with an attachment fitting according to the invention.

With reference to FIG. 1, the storage tank 10 is designed to hold a volatile inflammable liquid such as a liquefied gas, and particularly liquefied methane. The storage tank 10 has a primary liquid containment vessel comprising metal bottom 12 to which the bottom edge of vertical circular cylindrical metal wall 14 is joined, such as by welding.

The storage tank 10 also includes a secondary liquid containment vessel which includes a circular metal bottom 16, vertical circular cylindrical metal wall 18 and domed metal roof 20. Metal bottom 16 rests on load bearing layer 22 which is surrounded by footing 24.

Load bearing thermal insulation 26 is placed between outer metal bottom 16 and inner metal bottom 12 and effectively occupies the space therebetween. The space between inner wall 14 and outer wall 18 is filled with a suitable thermal insulation 28, such as perlite.

A suspended ceiling 30 is positioned within the upper part of the inner liquid containment vessel wall 14. The suspended ceiling 30 includes a plurality of vertical metal rods 32 joined at their upper ends to domed roof 20 and joined at their lower ends to horizontal metal deck 34 which is located above the maximum liquid level storage capacity of the tank. Thermal insulation 36 is supported by the upper surface of deck 34.

The secondary liquid containment vessel shown in FIG. 1 also includes a concrete wall 38 around steel wall 18 and an outer concrete roof 40 on top of metal domed roof 20.

Vapor vent pipe 42 extends through concrete roof 40 and metal roof 20 into the vapor space above the suspended ceiling 30. Furthermore, vertical pipe 44 extends through concrete roof 40, metal roof 20 and deck 34 into the lowermost space surrounded by the inner containment vessel. The same pipe 44 can be used to fill and empty the inner containment vessel or two similar pipes, one for filling and the other for emptying, can be used. In any event, a submerged pump, not shown, can be placed on the end of such a pipe for removing liquid.

At the same time concrete wall 38 is cast in place, attachment fitting 50 (FIGS. 1 to 4) is embedded in the concrete. The attachment fitting 50 has a tubular portion 52 laterally joined to metal wall 18 by weld 54. The metal wall 18 structurally obstructs liquid communication with the annular space occupied by insulation 28 between inner and outer walls 14 and 18 (FIGS. 2 and 3). In addition, such liquid communication is further structurally obstructed by concrete 56 inside of tubular portion 52.

The attachment fitting 50 is provided with a flange 58 on the end of the tubular portion 52 farthest from wall 18. The flange 58, furthermore, may be spaced outwardly from concrete wall 38 so that bolts can be readily attached to it.

Figure 4:
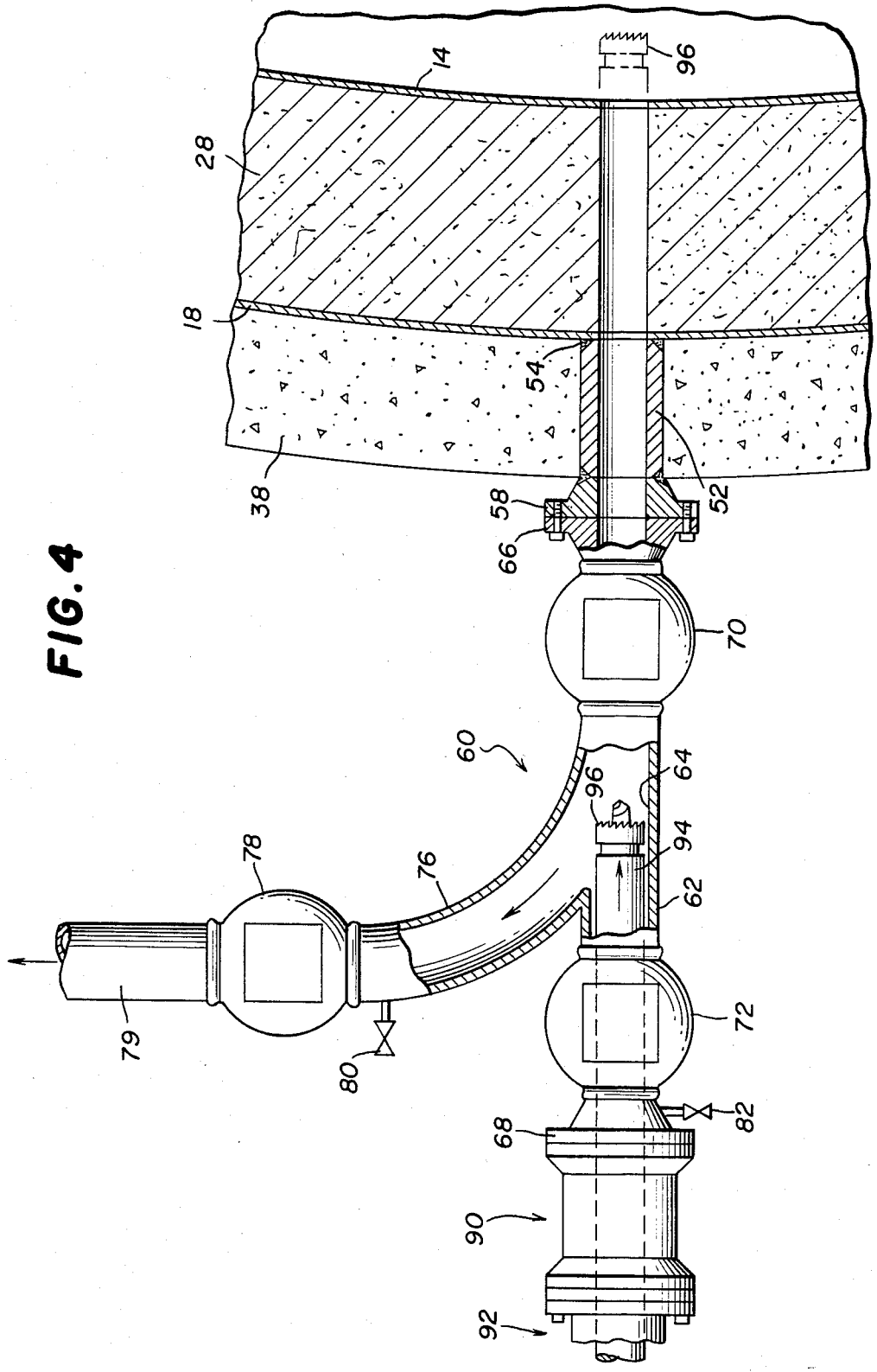
FIG. 4 is a plan view, partially in section, taken along the line 4—4 of FIG. 3.

In order to facilitate use of the attachment fitting 50 in the event it may become necessary or desirable to remove liquid from the tank through the fitting, an elbow assembly 60 adapted to be connected to the fitting is also provided. As shown in FIGS. 2 to 4, the elbow assembly 60 has an elongated member 62 with an axially straight bore 64. The inner end has a flange 66 adapted to be bolted to flange 58 on fitting 50 in a fluid tight arrangement. Also, the outer end is provided with flange 68. A ball valve 70, or similar full opening valve, is positioned on the elbow assembly 60 near the inner end adjacent flange 66 and ball valve 72 is positioned in elongated member 62 near the outer end adjacent flange 68. When open, the valves 70 and 72 do not significantly obstruct the longitudinal or axial bore 64.

A branch tubular horizontal arm 76, shown curved in FIG. 4, communicates with the elongated member 62 between valves 70 and 72. The branch arm 76 contains a ball valve 78 which communicates with conduit 79. Furthermore, a valved nozzle 80 communicates with the branch arm 76 between valve 78 and elongated member 62.

It is also desirable to have a valved nozzle 82 communicate with the bore 64 of the elongated member 62 between flange 68 and valve 72.

The elbow assembly 60 can be maintained in storage until such time as it may be needed or it can be essentially permanently attached to the flange 58 of fitting 50.

The flange 68 on the outer end of elbow assembly 60 is adapted to receive a tool bar, or shaft, packing and slide block 90 to which a tapping machine 92 is attached by bolts. An air powered or electrical driven tapping machine can be used. Regardless of the power source, the tapping machine includes an elongated extendable rotatable shaft or bar 94 on the end of which a cutter 96 is secured.

The tapping machine including the block 90 need not be attached to the elbow assembly 60 at the time the storage tank is constructed. Instead, the tapping machine 92 and the block 90 can be held available in safe storage in case it is needed in the future.

In the event there is a failure of the inner containment vessel and liquid escapes to the annular space between walls 14 and 18, and it becomes necessary or desirable to remove the liquid from such space, the described apparatus can be used for that purpose. If not already installed, the elbow assembly 60 is first bolted to flange 58 of attachment fitting 50. Then the block 90 and tapping machine 92 are installed on the elbow assembly as already described above. Valve 78 is closed as is nozzle 80. Nozzle 82 is then opened and used to supply an inert gas under pressure to the elbow assembly when valve 72 is opened. With valves 72 and 70 open the tapping machine is placed in operation so that the shaft 94 containing cutter 96 advances, cuts the concrete out of the tubular portion 52 of fitting 50, cuts through wall 18, cuts through insulation 28 and then cuts through wall 14 if required thereby providing a path for liquid flow. The shaft 94 is then retracted past valve 72. Valve 70 is kept open so that pressurized gas supplied by valved nozzle 82 can blow out any insulation or cuttings which may accumulate in the hole made by the tapping machine, or in elbow assembly 60. The valved nozzle 80 can be used for the same purpose and/or a vent for pressure relief. However, a flushing fluid can be supplied through nozzle 82 and be removed through nozzle 80, filtered and then returned to nozzle 82. Valve 72 is closed after removing insulation, cuttings and the tapping tool shaft.

Liquid is removed from the annular space, as well as from the inner containment vessel, by having valve 70 open, valve 72 closed and valve 78 in branch 76 open. The liquid will then flow to conduit 79 which can feed it to a suitable destination for disposal or further handling.

Figure 5:
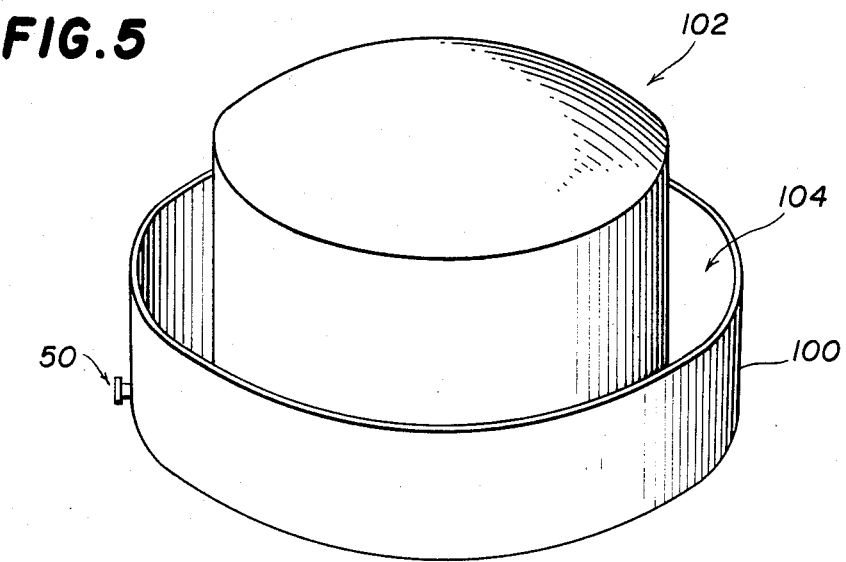
FIG. 5 is an isometric view of a second embodiment of storage tank having a separate containment wall which has an attachment fitting according to the invention.

FIG. 5 shows another type of storage tank and containment wall in which the invention can be used. The containment wall 100 is spaced outwardly from the storage tank 102. An attachment fitting 50, of the type already described, can be welded to wall 100 when it is made of metal. The wall 100 is left unitary or structurally continuous so as to prevent liquid or fluid communication between the fitting 50 and the annular space 104. In the event liquid escapes from tank 102 to the annular space 104, the liquid can be drained off through fitting 50 once a hole has been drilled in wall 100 using an elbow assembly and tapping machine as described above. If the hole becomes plugged by debris or insulation, it can be reopened as described.

Storage tanks provided according to the invention with an attachment fitting and the ancillary equipment as described permit removal of stored liquid when the exact type of failure of the primary containment vessel cannot be predicted or determined. It permits liquid removal when the submersible product pumps are inoperable because of the presence of a liquid/insulation slurry in the tank, and when pump well tubes do not survive a failure of the inner containment vessel. The invention is also capable of safe operation, even when it may be unsafe to place men on the outer roof.

The foregoing detailed description has been given for clearness of understanding only, and no unnecessary limitations should be understood therefrom, as modifications will be obvious to those skilled in the art.

What is claimed is:

1. A storage tank for a volatile inflammable liquid, liquefied gas or other liquid having properties which make it potentially dangerous comprising:
    a primary liquid containment vessel capable of storing the liquid;
    a secondary liquid containment vessel having a wall spaced outwardly from and surrounding a substantial portion of the primary vessel, thereby defining an annular space between the two vessels capable of containing liquid which may escape from the primary vessel if it fails or is damaged;
    the secondary vessel wall comprising an inner metal shell surrounded externally by a layer of reinforced concrete;
    an attachment fitting having a tubular portion permanently laterally joined to the secondary containment vessel wall;
    the fitting tubular portion being embedded in the concrete layer and joined to the inner shell by welding;
    means structurally obstructing liquid communication between the annular space and the tubular portion, said means comprising at least continuity of the inner metal shell; and
    the tubular portion of the fitting being filled with concrete.

2. A storage tank according to claim 1 in which the end of the tubular portion farthest from the wall has a flange external of the concrete.

* * * * *